(12) United States Patent
Izumi

(10) Patent No.: US 6,972,797 B2
(45) Date of Patent: Dec. 6, 2005

(54) AUTOMATIC FOCUSING DEVICE AND THE ELECTRONIC IMAGE PICKUP APPARATUS USING THE SAME

(75) Inventor: Akio Izumi, Nagano (JP)

(73) Assignee: Fuji Electric Co., Ltd., (JP)

( * ) Notice: Subject to any disclaimer, the term of this patent is extended or adjusted under 35 U.S.C. 154(b) by 926 days.

(21) Appl. No.: 09/978,839

(22) Filed: Oct. 17, 2001

(65) Prior Publication Data

US 2002/0080259 A1 Jun. 27, 2002

(30) Foreign Application Priority Data

Oct. 19, 2000 (JP) .............................. 2000-318822

(51) Int. Cl.⁷ ............................................. H04N 5/232
(52) U.S. Cl. ........................ 348/348; 348/349; 396/81; 396/93
(58) Field of Search ............................. 396/81, 93, 80, 396/105; 348/348, 345, 350, 354, 355, 356

(56) References Cited

U.S. PATENT DOCUMENTS

| | | | |
|---|---|---|---|
| 4,841,370 A | * | 6/1989 | Murashima et al. ........ 348/356 |
| 4,914,464 A | * | 4/1990 | Azuma et al. ................ 396/81 |
| 4,963,985 A | * | 10/1990 | Isoguchi et al. ............ 348/348 |
| 5,049,731 A | * | 9/1991 | Ishida et al. ................ 396/111 |
| 5,258,802 A | * | 11/1993 | Arimoto et al. ............... 396/79 |
| 5,436,656 A | * | 7/1995 | Soga et al. .................. 348/354 |
| 5,448,413 A | * | 9/1995 | Kobayashi et al. ........... 396/82 |
| 5,652,923 A | * | 7/1997 | Kawanami .................... 396/81 |
| 5,734,938 A | * | 3/1998 | Hamada et al. ............... 396/95 |
| 6,144,805 A | * | 11/2000 | Ogino .......................... 396/81 |
| 6,822,687 B1 | * | 11/2004 | Kakiuchi et al. ........... 348/348 |
| 6,900,842 B2 | * | 5/2005 | Saito et al. ................. 348/348 |
| 2002/0006279 A1 | * | 1/2002 | Ide .............................. 396/79 |

FOREIGN PATENT DOCUMENTS

| | | |
|---|---|---|
| JP | 5-210043 | 8/1993 |
| JP | 2000-121924 | 4/2000 |

* cited by examiner

Primary Examiner—Wendy R. Garber
Assistant Examiner—Jason Whipkey
(74) Attorney, Agent, or Firm—Rossi, Kimms & McDowell, LLP

(57) ABSTRACT

An auto-focusing device and an electronic image pickup apparatus facilitates realizing a high focusing accuracy and a quick focusing operation simultaneously using an inexpensive plastic lens mount. The auto-focusing device according includes a means for correcting the conversion reference, if necessary, for converting the object distance measured by the open-control range finding means to a focusing position of the focusing lens based on the conversion reference and for moving the focusing lens to the converted focusing position. The electronic image pickup apparatus includes the auto-focusing device.

12 Claims, 6 Drawing Sheets

AUTOMATIC FOCUSING DEVICE AND THE ELECTRONIC IMAGE PICKUP APPARATUS USING THE SAME

FIELD OF THE INVENTION

The present invention relates to an automatic focusing device (hereinafter referred to as an "auto-focusing device") for focusing an image pickup lens automatically and electronic image pickup apparatuses such as an electronic still camera and a video camera, that mount the auto-focusing device thereon.

BACKGROUND OF THE INVENTION

The still camera and such electronic image pickup apparatuses employ image pickup devices such as charge coupled devices (CCD's) and metal oxide semiconductor (MOS) devices. The image pickup devices convert the optical image of an object picked up through an optical image pickup system to electric image signals. The electric image signals outputted from the image pickup devices are stored in a storage medium mounted on the electronic image pickup apparatus.

Electronic image pickup apparatuses which include an auto-focusing device are in common use today. The auto-focusing device used for the electronic image pickup apparatus employs, for example, the contrast detection method for detecting the state of focusing. The auto-focusing device that employs the contrast detection method includes a through-the-lens (TTL) focus detecting means, that detects the focusing state of the object image based on the difference (contrast) between the amounts of the high frequency components contained in the image signals outputted from the image pickup device. The auto-focusing device adjusts the focal point of the image pickup optical system automatically based on the state of focusing detected by the TTL focus detecting means.

The auto-focusing device used in many compact cameras for the silver film employs the other method, which measures the distance between the camera and the object (hereinafter referred to as the "object distance"). The auto-focusing device that employs the other method includes an open-control range finding means for measuring the object distance. The auto-focusing device adjusts the focal point of the image pickup optical system automatically based on the object distance detected by the range finding means. The open-control range finding means may be classified into an active one and a passive one.

The active open-control range finding means includes a light emitting means such as a light emitting diode (LED) for emitting ultraviolet light to the object and a light intercepting means such as a position sensitive device (PSD) for intercepting the light reflected from the object. The active open-control range finding means calculates the distance between the object and the range finder (hereinafter referred to also as the "object distance") by the method of triangulation based on the angle between the emitted light and the reflected light.

The passive open-control range finding means includes at least two equivalent image pickup optical systems including a pair of lenses and linear sensors integrated into a one-chip IC. The passive open-control range finding means detects the object distance based on the parallax between the images picked up through the respective image pickup optical systems.

The active open-control range finding means and the passive open-control range finding means, that use the method of triangulation, facilitate detecting the object distance by one single range finding operation and positioning the image pickup lens at the focusing point. The active open-control range finding means and the passive open-control range finding means obviate the problem of slow focusing of the TTL focus detecting means and realize high-speed focusing. The active open-control range finding means and the passive open-control range finding means conduct the range finding operation once for one image pickup operation. The active open-control range finding means and the passive open-control range finding means avoid repeated driving of the CCD image pickup devices, that the TTL focus detecting means should conduct. Therefore, the active open-control range finding means and the passive open-control range finding means facilitate reducing the current consumption greatly. Especially when the sensor IC for the passive open-control range finding means is formed of MOS devices, the current consumption is almost zero.

Since the sensor IC for the passive open-control range finding means requires less pixels for range finding in not so bright circumstances as compared with the image pickup device of the camera, the pixel size may be widened and a less complicated but bright optical system may be used for the sensor IC. Since the sensor IC for the passive open-control range finding means is from 500 to 1000 times as sensitive as the image pickup device of the camera, the sensor IC can detect with sufficient accuracy an object illuminated not so brightly.

In addition to the conventional auto-focusing devices described above, Japanese Unexamined Laid Open Patent Application H05-210043 discloses an auto-focusing device according to the prior art. This auto-focusing device includes an active open-control range finding means and a TTL focus detecting means of contrast detection type. The active open-control range finding means focuses an object roughly and the TTL focus detecting means finally focuses the object accurately.

Japanese Unexamined Laid Open Patent Application 2000-121924 discloses another auto-focusing device according to the prior art. This auto-focusing device includes a TTL focus detecting means of contrast detection type including an AF auxiliary light emitter. The auto-focusing device detects accurately a low-contrast object or an object not well illuminated by irradiating light from the AF auxiliary light emitter.

The conventional TTL focus detecting means and the conventional open-control range finding means have respective shortcomings. First, the shortcomings of the conventional TTL focus detecting means will be described. As soon as the shutter release of the camera is pressed, the TTL focus detecting means repeats picking up an image while the focusing point of the focusing lens system in the image pickup lens is moving from the far side to the near side or vice versa. The TTL focus detecting means determines that the image is focused when the TTL focus detecting means has detected, by the mountain climbing method, the lens position, thereat the amount of the high frequency components contained in the image signal is the largest.

Since it is necessary to compare a great deal of data, it takes time to detect the state of focusing especially when the image pickup lenses are far from the focusing position at the start. Since it is necessary to drive the CCD image pickup devices repeatedly, high current consumption is caused, and, therefore, the battery is consumed soon.

In a dark condition, therein the object is dark, the focusing of the object is detected not so accurately and the time necessary to detect the focusing point is further prolonged due to more noises contained in the image signal. In these days, the sensitivity of the pixel is low due to the pixel size reduced to improve the image quality. Although sufficient brightness is obtained by a flash light during the image pickup operation, the insufficient sensitivity of the pixel causes low detection accuracy of the focusing position in the dark circumstances, since the flash light is not irradiated during the focusing operation. As described above, the shortcomings of the TTL focus detecting means more adversely impact the ability to obtain a higher image quality by minimizing the CCD image pickup devices, to increasing the zooming ratio of the image pickup lens, and to reduce power consumption. It is therefore desirable to obviate the shortcomings of the TTL focus detecting means.

The shortcomings of the open-control range finding means will now be described. Since the open-control range finding means executes an open control to detect the focusing point, the open-control range finding means is not employable to the auto-focusing device when the focusing position of the image pickup lens corresponding to the object distance is not predictable. To obviate this problem, the open-control range finding means uses a conversion reference for calculating the focusing position of the focusing lens corresponding to the object distance in order to predict the focusing position of the image pickup lens corresponding to the object distance.

The open-control range finding means has been used in compact cameras for silver based films without difficulty. However, it is difficult to use the open-control range finding means in electronic still cameras. Since the image pickup device in the electronic still camera is much smaller than the film size, the focal length is correspondingly short. The focal length of 6.5 mm for the CCD of a half-inch corresponds to the standard lens of 35 mm in focal length for the Lica size film (24 mm×36 mm). Therefore, it is difficult for the open-control range finding means to accurately position the image pickup lens of the electronic still camera.

In a typical inexpensive camera that uses a plastic lens mount, dimension variations, caused in association with the variations of the temperature and the humidity, are too large for the given focal depth due to the movements of the focal point caused by zooming and the rattle between the lenses and the lens mount. Due to the dimension variations, the conversion reference is not correctly applied and, therefore, the focusing position of the image pickup lens is not correctly predicted. Therefore, the electronic still camera has no choice but to employ a TTL focus detecting means according to the closed control method. As explained so far, the conventional TTL focus detecting means and the conventional open-control range finding means have respective shortcomings in the applications thereof to the electronic still camera.

The auto-focusing device disclosed in the foregoing Japanese Unexamined Laid Open Patent Application H05-210043 includes an active open-control range finding means and a TTL focus detecting means of contrast detection type. This auto-focusing device focuses the object image to some extent by the active open-control range finding means. However, the auto-focusing device relies on the TTL detecting means to finally focus the object image. Therefore, the auto-focusing device disclosed in Japanese Unexamined Laid Open Patent Application H05-210043 is not free from the shortcomings of the TTL focus detecting means.

Since the auto-focusing device disclosed in Japanese Unexamined Laid Open Patent Application 2000-121924 employs a TTL focus detecting means of contrast detection type, it takes time to detect the state of focusing by comparing lots of data, the current consumption is high, and, therefore, the battery is quickly consumed. As explained so far, an auto-focusing device that obviates the shortcomings of the conventional TTL focus detecting means and the conventional open-control range finding means, and fully utilizes the merits of the TTL focus detecting means and the open-control range finding means, has not been realized yet.

In view of the foregoing, it would be desirable to provide an auto-focusing device and an electronic image pickup apparatus, that facilitate simultaneously realizing a high focusing accuracy specific to the TTL focus detecting means and a quick focusing operation specific to the open-control range finding means. It is another object of the invention to provide an auto-focusing device and an electronic image pickup apparatus, that facilitate using an inexpensive plastic lens mount.

SUMMARY OF THE INVENTION

According to an aspect of the invention, there is provided an automatic focusing device including: an image pickup lens including focusing lens, the focusing lens moving to form the image of an object; an image pickup means, the image pickup means picking up the image of the object, the image pickup means outputting an electrical signal indicating the image of the object; a TTL focus detecting means, the TTL focus detecting means detecting the focusing state of the image pickup lens based on the electrical signal output from the image pickup means; an open-control range finding means, the open-control range finding means measuring the distance of the object between the automatic focusing device and the object; a focusing lens position detecting means, the focusing lens position detecting means detecting the position or the shift length of the focusing lens; a driving and controlling means, the driving and controlling means obtaining a focusing position of the focusing lens based on a conversion reference for converting the distance of the object measured by the open-control range finding means to the focusing position of the focusing lens to move the focusing lens to the focusing position thereof; the driving and controlling means moving the focusing lens based on the focusing state of the image pickup lens detected by the TTL focus detecting means when it is necessary to correct the conversion reference; the driving and controlling means making the focusing lens position detecting means detect the focusing position or the shift length of the focusing lens; the driving and controlling means making the open-control range finding means measure the distance of the object; and the driving and controlling means correcting the conversion reference based on the detected focusing position, thereat the image of the object is focused, or the detected shift length of the focusing lens, thereat the image of the object is focused, and the measured distance of the object.

The auto-focusing device according to the invention shifts the focusing lens to the accurate focusing position thereof by the TTL focus detecting means and corrects, if necessary, the conversion reference automatically, based on the shift length of the focusing lens and the distance of the object measured by the open-control range finding means, in order to always keep an accurate conversion reference. Since the distance of the object measured by the open-control range finding means is converted to the focusing position of the focusing lens, the focusing lens is always positioned at the correct focusing position. Therefore, even the open-control range finding means makes the image pickup lens form a well focused image of the object.

Advantageously, the conversion reference is a lens focusing curve relating the inverse of the distance of the object and the position of the focusing lens, and the correction of the conversion reference includes shifting the lens focusing curve such that the lens focusing curve passes the point defined by the inverse of the distance of the object measured by the open-control range finding means and the focusing position of the focusing lens detected by the focusing lens position detecting means or selecting a lens focusing curve, that passes the point defined by the inverse of the distance of the object measured by the open-control range finding means and the focusing position of the focusing lens detected by the focusing lens position detecting means, from a plurality of lens focusing curves stored in advance.

Alternatively, the correction of the conversion reference includes calculating a new focusing position of the focusing lens by adding the shift length of the focusing lens detected by the focusing lens position detecting means to the focusing position not corrected yet to obtain a new lens focusing curve, that passes the point defined by the inverse of the distance of the object measured by the open-control range finding means and the new focusing position of the focusing lens, or selecting a lens focusing curve, that passes the point defined by the inverse of the distance of the object measured by the open-control range finding means and the new focusing position of the focusing lens, from a plurality of lens focusing curves stored in advance. The methods of correcting the conversion reference are programmable in the driving and controlling means.

Advantageously, the image pickup lens includes zoom lenses, and the conversion reference is corrected one or more times when the zooming ratio of the image pickup lens exceeds a predetermined range. The present inventor has found it necessary to correct the conversion reference when the zooming ratio is changed. By correcting the conversion reference when the zooming ratio is changed, the open-control range finding means facilitates focusing the image of the object quickly and accurately even when the image pickup lens executes high-ratio zooming.

Advantageously, the automatic focusing device further includes a temperature measuring means, that measures the temperature of the automatic focusing device, and a temperature storage means, that stores the measured temperature, and the conversion reference is corrected one or more times when the difference between the present temperature measured by the temperature measuring means and the last temperature measured during the last correction and stored in the temperature storage means exceeds a predetermined range.

The present inventor has found it necessary to correct the conversion reference when a large temperature change occurs. By correcting the conversion reference when a large temperature change occurs, the open-control range finding means facilitates focusing the image of the object quickly and accurately even when a large environmental change is caused.

According to another aspect of the invention, there is provided an electronic image pickup apparatus including: an image pickup lens including focusing lens, the focusing lens moving to form the image of an object; an image pickup means, the image pickup means picking up the image of the object, and outputting an image signal; a TTL focus detecting means, the TTL focus detecting means detecting the focusing state of the image pickup lens based on the image signal outputted from the image pickup means; a storing and reproducing means, the storing and reproducing means storing the image of the object based on the image signal outputted from the image pickup means, the storing and reproducing means reproducing the stored image of the object; an open-control range finding means, the open-control range finding means measuring the distance of the object between the electronic image pickup apparatus and the object; a focusing lens position detecting means, the focusing lens position detecting means detecting the position or the shift length of the focusing lens; a driving and controlling means, the driving and controlling means obtaining a focusing position of the focusing lens based on a conversion reference for converting the distance of the object measured by the open-control range finding means to the focusing position of the focusing lens to move the focusing lens to the focusing position thereof; the driving and controlling means moving the focusing lens based on the focusing state of the image pickup lens detected by the TTL focus detecting means when it is necessary to correct the conversion reference; the driving and controlling means making the focusing lens position detecting means detect the focusing position or the shift length of the focusing lens; the driving and controlling means making the open-control range finding means measure the distance of the object; and the driving and controlling means correcting the conversion reference based on the detected focusing position or the detected shift length of the focusing lens, thereat the image of the object is focused, at the measured distance of the object.

Advantageously, the image pickup lens is exchangeable, and the conversion reference is corrected one or more times when image pickup lens is changed to another one. The present inventor has found it is necessary to correct the conversion reference every time when the image pickup lens is exchanged to another one. By correcting the conversion reference when the image pickup lens is changed to another one, the open-control range finding means facilitates focusing the image of the object quickly and accurately corresponding to the new image pickup lens.

Advantageously, the electronic image pickup apparatus further includes a release switch capable of conducting a first stage of switching, thereat the release switch is pressed halfway, and a second stage of switching, thereat the release switch is pressed fully, the conversion reference is corrected one or more times when the first stage of switching is conducted, and the focusing lens is moved to the focusing position thereof calculated from the distance of the object measured by the open-control range finding means when the second stage of switching is conducted.

The present inventor has found it is necessary to correct the conversion reference every time when the image of the object is picked up when the release switch is pressed. The electronic image pickup apparatus corrects the conversion reference when the release switch is pressed halfway and picks up the image of the object focused quickly and accurately by the open-control range finding means. The electronic image pickup apparatus facilitates continuous pick up of the image of the object.

BRIEF DESCRIPTION OF THE DRAWINGS

The invention will be described with reference to certain preferred embodiments thereof and the accompanying drawings, wherein:

FIG. 3(*b*) shows a pair of curves explaining the conversion reference for converting the object distance to the focusing position of the variable focal lens;

DETAILED DESCRIPTION OF THE PREFERRED EMBODIMENTS

Figure 1:
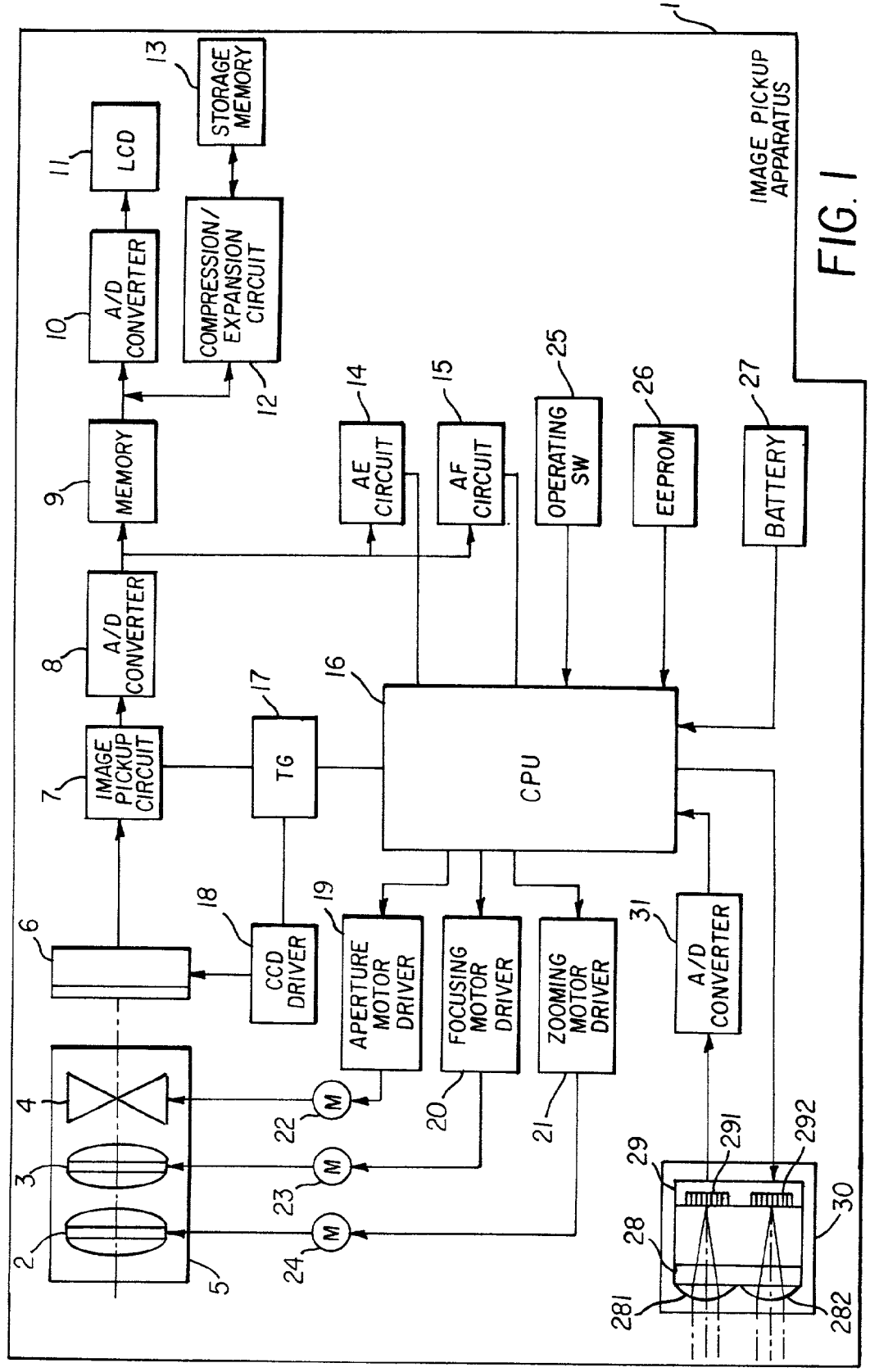
FIG. 1 is a block diagram of an electronic image pickup apparatus including an auto-focusing device according to the invention.

FIG. 1 is a block diagram of an electronic image pickup apparatus including an auto-focusing device according to the invention. Referring now to FIG. 1, the electronic image pickup apparatus 1 includes a lens mount 5 including a zoom lens 2 (including one or more lens elements), a focusing lens 3 (including one or more lens elements) and an aperture 4; a CCD (charge coupled device) 6; an image pickup circuit 7; an A/D (analog/digital) converter 8; a memory 9; a D/A (digital/analog) converter 10; an LCD (liquid crystal display) 11; a compression/expansion circuit 12; a storage memory 13; an AE (automatic exposure) circuit 14; an AF (auto-focusing) circuit 15; a CPU (central processing unit) 16, a TG (timing signal generator) 17, a CCD driver 18; an aperture motor driver 19; a focusing motor driver 20; a zooming motor driver 21; an aperture driving motor 22; a focusing motor 23; a zooming motor 24; operating SW's (switches) 25; an EEPROM (electrically-erasable programmable read-only memory) 26; a battery 27; an AF module 30 including an AF lens pair 28 formed of a pair of AF lenses 281, 282 and an AF sensor IC 29 formed of a pair of line sensors 291, 292; and an A/D converter 31 for auto-focusing.

The functions of the constituent components will be described below. The zoom lens 2 constitute a zooming optical system. The focusing lens 3 constitutes a focusing optical system. The zoom lens 2 and the focusing lens 3 constitute an image pickup optical system. The aperture 4 is a light amount adjusting means or a light exposure means for adjusting the amount of the light bundles that transmit through the image pickup optical system and the light exposure means. The zoom lens 2, the focusing lens 3 and the aperture 4 mounted on the lens mount 5 constitute an image pickup lens system according to the invention. The CCD 6 is a solid-state image pickup device for converting the optical image of an object picked up by the image pickup lens to an electric signal. The image pickup circuit 7 conducts various image processing operations on the electric signal, that the CCD 6 outputs as a result of its photoelectric conversion, and outputs a predetermined image signal. The A/D converter 8 converts the analog image signal outputted from the image pickup circuit 7 to digital image data. The CCD 6, the image pickup circuit 7 and the A/D converter 8 constitute an image pickup means according to the invention.

The memory 9 is a temporary storage means such as a buffer memory, that temporarily stores the image data outputted from the A/D converter 8. The D/A converter 10 converts the image data temporarily stored in the memory 9 to an analog image signal suitable to an output for displaying and outputs the analog image signal. The LCD 11 is a liquid crystal display, that converts the image signal to an image and displays the image. The compression/expansion circuit 12 includes both a compressor circuit and an expander circuit. The compressor circuit reads out the image data temporarily stored in the memory 9, conducts compressing, coding and processing of the image data to convert the form of the image data to an appropriate one suitable for storing in the storage memory 13 and outputs the compressed image data to the storage memory 13. The expander circuit decodes and expands the compressed image data stored in the storage memory 13 to convert the form of the compressed image data to an appropriate one suitable for reproducing and for displaying and outputs the decoded and expanded image data.

The storage memory 13 is a storage medium that stores the compressed image data. The storage memory 13 is a semiconductor memory such as a flash memory integrated in the electronic image pickup apparatus 1, or a semiconductor memory such as a flash memory card and a flash memory stick attachable to and detachable from the electronic image pickup apparatus 1. Alternatively, magnetic storage media such as a hard disk and a floppy disk, and a magnetic optical (MO) storage media may be used for the storage memory 13. The memory 9, the compression/expansion circuit 12 and the storage memory 13 constitute a storing and reproducing means according to the invention.

The AE circuit 14 detects an AE signal necessary to conduct an automatic exposure operation (AE operation) based on the image data outputted from the A/D converter 8 and outputs an AE evaluation signal. The AF circuit 15 detects a TTL-AF (through-the-lens auto-focusing) signal necessary to conduct TTL focus detection based on the image data outputted from the A/D converter 8 and outputs a TTL-AF evaluation signal. The CPU 16 is a control means for controlling the entire electronic image pickup apparatus 1. The control conducted by the CPU 16 will be described in detail later. The timing signal generator (hereinafter referred to as "TG") 17 generates a predetermined timing signal. The CCD driver 18 drives and controls the CCD 6.

The AF lens pair 28 includes a pair of AF lenses 281 and 282. The AF sensor IC 29 includes line sensors 291 and 292 such as CCD's on the optical axes of the AF lenses 281 and 282. The line sensors 291 and 292 conduct photoelectric conversion of the object images through the AF lens pair 28. The AF module 30 is a module, that incorporates the AF lens pair 28 and the AF sensor IC 29 with the positions thereof adjusted therein and outputs linear image signals from the line sensors 291 and 292 at a predetermined timing in response to the control signal from the CPU 16. The linear image signals are necessary to conduct open-control range finding. Auto-focusing is conducted based on the linear image signals outputted from the AF module 30 without using the image signal from the CCD 6.

The A/D converter 31 for auto-focusing converts the analog linear image signals outputted from the AF module 30 to digital image data. The CPU 16 calculates the object distance based on the principle of triangulation using the digital image data outputted from the A/D converter 31.

The aperture driving motor 22 drives the aperture 4 to adjust the amount of the light impinging onto the CCD 6. The aperture motor driver 19 drives the aperture driving motor 22. The focusing motor 23 is a pulse motor that drives the focusing lens 3 to focus the object image. The focusing motor driver 20 drives the focusing motor 23. The zooming motor 24 drives the zoom lens 2 to change the zooming ratio. The zooming motor driver 21 drives and controls the zooming motor 24.

The EEPROM 26 is an electrically-erasable programmable read-only memory connected electrically to the CPU 16. The EEPROM 26 stores, in advance, the programs for various control operations and the data for conducting various operations. The operating SW's (hereinafter referred to as the "SW's") 25 includes various operating switches for conducting various operations connected electrically to the CPU 16. The SW's 25 generate command signals to conduct various operations. The SW's 25 include a main power supply switch, that generates a command signal for starting the electronic image pickup apparatus 1 and for supplying electric power, a release switch, that generates command signals for starting the image pickup operation (storing operation), a reproducing switch, that generates a command signal for starting the reproducing operation, and zoom switches including a zoom-up switch (zoom-up SW) and a zoom-down switch (zoom-down SW), that generate command signals for moving the zoom lens 2 in the image pickup optical system to start the zooming operation.

The release switch is capable of conducting a first stage of switching (hereinafter referred to as a "first release SW"), that generates a command signal for starting automatic exposure and auto-focusing in advance to an image pickup operation, and a second stage of switching (hereinafter referred to as a "second release SW"), that generates a command signal for starting the actual image pickup operation. According to the invention, the release switch is constructed such that the first release SW is always ON when the second release SW is ON. The battery 27 is a power supply for supplying electric power to the foregoing constituent components of the electronic image pickup apparatus 1. Although not shown in FIG. 1, a temperature measuring means for measuring the temperature of the electronic image pickup apparatus 1 is connected to the CPU 16. A temperature storage means for storing the temperature data obtained by the temperature measuring means is connected to the temperature measuring means. The EEPROM 26, the main storage integrated in the CPU 16 or the resister integrated in the CPU 16 may be used for the temperature storage means.

Now the operations of the electronic image pickup apparatus 1 and the signal flow therein will be described below. The constituent components of the electronic image pickup apparatus 1 conduct respective operations independently. The operations of the electronic image pickup apparatus 1 include auto-focusing conducted by the open-control range finding means, auto-focusing conducted by the TTL focus detecting means, automatic exposure, zooming, stopping the zooming, auto-focus correction, timing signal generation, storing and reproducing.

Figure 2:
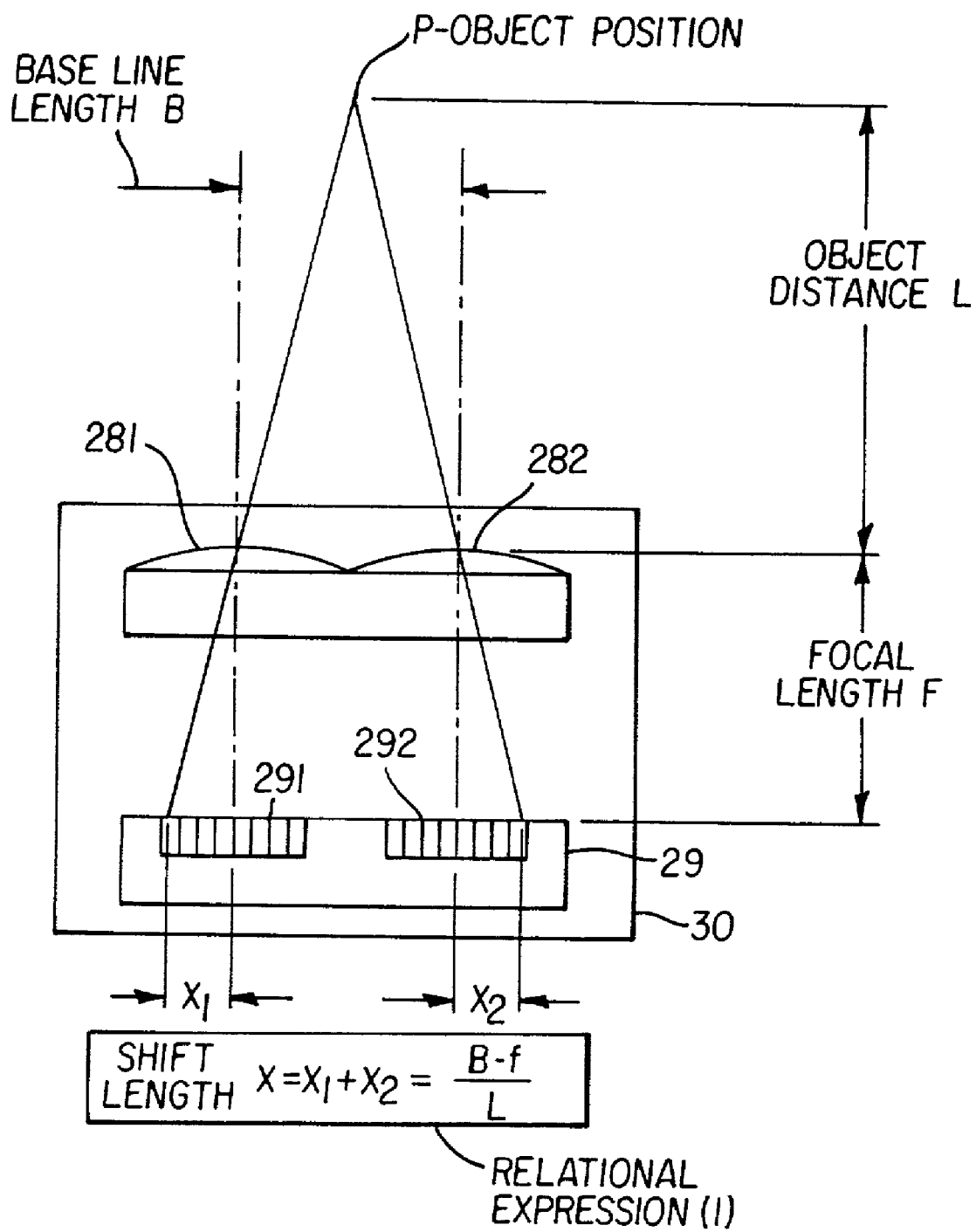
FIG. 2 is a schematic drawing for explaining the method of measuring the object distance, that the auto-focusing module shown in FIG. 1 employs.

First, the auto-focusing operation (AF operation) conducted by the open-control range finding means will be described. The open-control range finding means of the auto-focusing device according to the invention is formed of the CPU 16, the AF module 30 and the AID converter 31. The auto-focusing device measures the object distance using these constituent components and conducts auto-focusing based on the measured object distance. FIG. 2 is a schematic drawing for explaining the method of measuring the object distance that the AF module 30 employs.

As described in FIG. 2, the AF module 30 picks up the images of the object at the position P with the AF lenses 281, 282 and the line sensors 291, 292. The linear image signals (analog signals) outputted from the line sensors 291 and 292 are converted to digital image data by the A/D converter 31. The CPU 16 reads the digital image data. Since the object images projected on the line sensors 291 and 292 shift depending on the object distance L as shown in FIG. 2, the CPU calculates the shift length X. Once the shift length X is found, the CPU calculates the object distance L using the following relational expression (1), that relates the shift length X, the base line length B, that is the distance between the optical axes of the AF module 30, the focal length f, and the object distance L with each other.

$$X = X_1 + X_2 = B \times f / L \tag{1}$$

The method of calculating the object distance using the shift length is disclosed in Japanese Unexamined Laid Open Patent Application 2000-146572. Although the object distance L is calculated independently of the output of the CCD6, the auto-focusing device according to the invention drives the focusing motor 23 and focusing lens 3 based on the result of the calculation to automatically adjust the focusing point of the images picked up by the CCD 6. Therefore, the AF operation conducted by the auto-focusing device according to the invention belongs to the open control. The AF module 30, the A/D converter 31 and the CPU 16 are involved in the open control. The CPU 16 calculates the focusing position of the focusing lens 3 using the object distance L as described below.

FIG. 3(*a*) shows a pair of curves explaining the conversion reference for converting the object distance to the focusing position of the usual lens. FIG. 3(*b*) shows a pair of curves explaining the conversion reference for converting the object distance to the focusing position of the variable focal lens. Although lens focusing curves C1 and C2 working as conversion references are shown in FIG. 3(*a*), explanation will be made using the focusing curve C1.

When the object distance is L, the CPU 16 calculates the inverse of L, that is 1/L. Then, the CPU 16 calculates the focusing position A of the focusing lens 3. The CPU 16 makes the focusing motor driver 20 drive the focusing motor 23 to shift the focusing lens 3 to the focusing position A. The lens position or the lens shift length is calculated by counting the pulses, with that the focusing motor 23, that is a pulse motor, is driven. The CPU 16 counts the pluses and stops the focusing motor 23 as soon as the number of the pluses reaches a predetermined value such that the focusing lens 3 stops at the focusing position A. In this sequence of the operations, the CPU 16 works as a focusing lens position detecting means for detecting the focusing lens position. When the focusing motor 23 is a servo-motor, the CUP 16 and a not shown encoder or not shown encoders mounted on the shaft of the servo-motor work as the focusing lens position detecting means.

For the open-control range finding means, the above described AF module 30, utilizing the external light and based on the principle of triangulation, and an active open-control range finding means are used. The active open-control range finding means includes a light emitting means such as a light emitting diode (LED), that emits infrared light, and a light intercepting means such as an optical position sensitive device (PSD), that intercepts the light emitted from the light emitting means and reflected by the object. The light emitted by the light emitting means to irradiate the object is reflected by the object and the reflected light is intercepted by the light intercepting means. The active open-control range finding means calculates the distance between the active open-control range finding means and the object, that is the object distance, from the angle between the irradiated light and the reflected light based on the principle of triangulation. The active open-control range finding means may be used in substitution for the AF module 30. The open-control range finding means conducts the AF operation thereof as described above.

The AF operation by the TTL focus detecting means will now be described. The light bundle from the object (hereinafter referred to as the "object light bundle"), that has passed through image pickup optical system in the lens mount 5 of the electronic image pickup apparatus 1, reaches the light intercepting plane of the CCD 6 and an object image is formed thereon. In this stage, the aperture 4 is open. The object image formed on the light intercepting plane of the CCD 6 is converted through the photoelectric conversion by the CCD 6 to an electrical signal and the electrical signal is outputted to the image pickup circuit 7. The image pickup circuit 7 conducts various image processing operations on the signal inputted from the CCD 6 to form a predetermined image signal. The image signal outputted to the A/D converter 8 is converted to digital image data in the A/D converter 8. The digital image data is stored temporarily in the memory 9. The digital image data stored temporarily in the memory 9 is outputted to the D/A converter 10. The D/A converter 10 converts the image data to an analog image signal suitable for displaying. The LCD 11 displays an image using the analog image signal. The LCD 11 that keeps displaying the image signal obtained by the CCD 6, works as a viewfinder means for determining the image pickup range. The digital image data obtained by the A/D converter 8 is also output to the AF circuit 15. The AF circuit 15 extracts the high frequency components of the image data for one frame through a high-pass filter (HPF) and calculates the cumulative sum of the high frequency components.

By the above described operation, a TTL-AF evaluation value corresponding to the amount of the contour components on the high frequency side is calculated. The TTL-AF evaluation value is outputted to the CPU 16. Then, the CPU 16 shifts the focusing lens 3 and obtains the TTL-AF evaluation values at the respective positions of the focusing lens 3. The CPU 16 determines, as described below, that the focusing lens 3 are at the focusing position $A_F$, threat the amount of the high frequency components is the largest.

Figure 4:
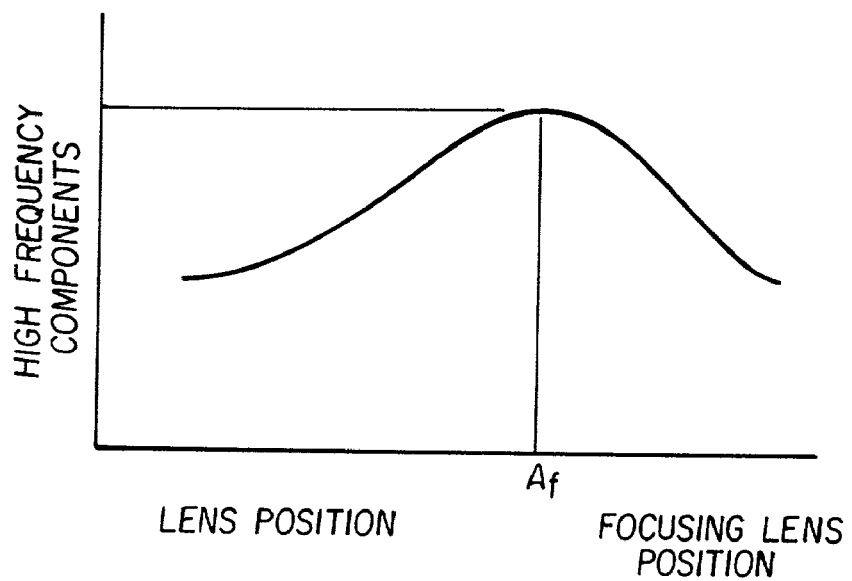
FIG. 4 shows a curve explaining the operation of the TTL focus detecting means of the auto-focusing device according to the invention.

FIG. 4 shows a curve explaining the above described operation of the TTL focus detecting means of the auto-focusing device according to the invention. In FIG. 4, the horizontal axis represents the lens position and the vertical axis the cumulative amount of the high frequency components of the image data. The position, thereat the cumulative amount of the high frequency components is the largest, is deemed as the focusing lens position $A_F$. The TTL focus detecting means determines that the position, thereat the cumulative amount of high frequency components is the largest, is the focusing lens position $A_F$. The CPU 16 selects the position, thereat the cumulative amount of the high frequency components is the largest. The AF circuit 15 and the CPU 16 work as the parts of the TTL focus detecting means.

When the focusing lens position $A_F$ is obtained from the TTL-AF evaluation values calculated in the AF circuit 15, the CPU 16 stops the focusing lens 3 at the focusing lens position $A_F$ and stops the AF operation thereof. The lens position or the lens shift length is calculated by counting the pulses, with that the focusing motor 23, that is a pulse motor, is driven. The CPU 16 counts the number of pulses until the focusing lens 3 stop at the focusing lens position $A_F$ and the object image is focused. The focusing lens position or the lens shift length is calculated from the counted number of the pulses. In this case, the CPU 16 works as the focusing lens position detecting means. When the focusing motor 23 is a servo-motor, the CUP 16 and a not shown encoder or not shown encoders mounted on the shaft of the servo-motor work as the focusing lens position detecting means. The TTL focus detecting means conducts the AF operation thereof as described above.

The AE operation will now be described. As described above, the digital image data obtained by the CCD 6 and the A/D converter 8 is outputted to the memory 9 and to the AE circuit 14 independently. The AE circuit 14 calculates the cumulative sum of the brightness values contained in the image data for one frame based on the inputted digital image data. The AE evaluation value corresponding to the brightness of the object is calculated based on the cumulative sum. The AE evaluation value is outputted to the CPU 16. The AE circuit 14 is a brightness detecting means, that works as a photometric measuring means, for detecting the brightness of the object based on the image signal obtained by the CCD 6. The CPU 16 outputs a control signal to the aperture motor driver 19 based on the AE evaluation value calculated in the AE circuit 14. The aperture motor driver 19 drives the aperture motor 22 so that the aperture 4 may be closed appropriately. The AE operation is conducted as described above.

The zooming operation and the stopping operation of the zooming will now be described. After the light amount adjustment by the AE operation and the AF operations by the open-control range finding means and the TTL focus detecting means are completed, the operator presses the not-shown zoom-up SW or the not-shown zoom-down SW of the operating SW's 25 to start a zooming operation. When the operator presses the zoom-up SW, the CPU 16 drives the zooming motor 24 through the zooming motor driver 21 to shift the zoom lens 2 along the optical axis. The variable magnification operation based on the zooming is conducted continuously while the zoom-up SW is being pressed. The zooming operation is conducted as described above. When the operator watching the image displayed on the LCD 11 finds that a desired image is obtained, the operator stops pressing the zoom-up SW. As soon as the operator stops pressing the zoom-up SW, the CPU 16 stops the zooming operation. The zooming operation is stopped as described above. The zooming motor 24 and the zooming motor driver 21 constitute a zooming means for moving the zoom lens 2 to change the magnification of the image pickup optical system (to zoom the object image).

Figure 3A:
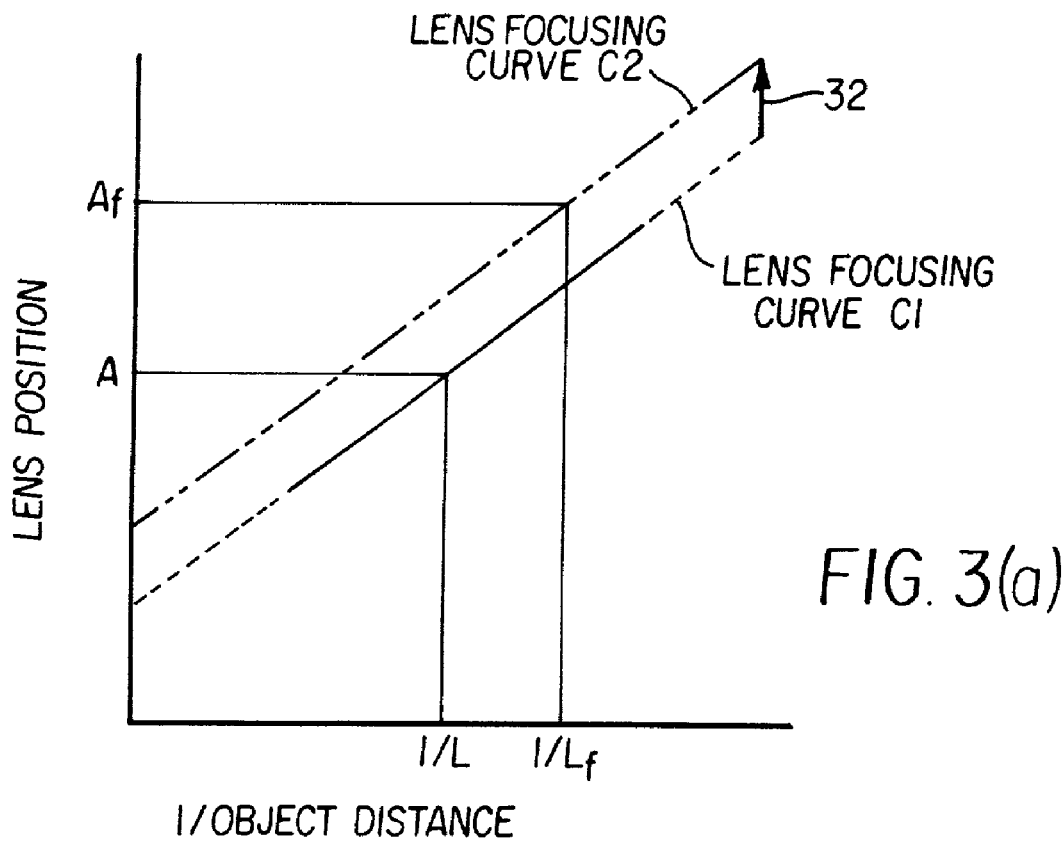
FIG. 3(*a*) shows a pair of curves explaining the conversion reference for converting the object distance to the focusing position of the usual lens.
Figure 5:
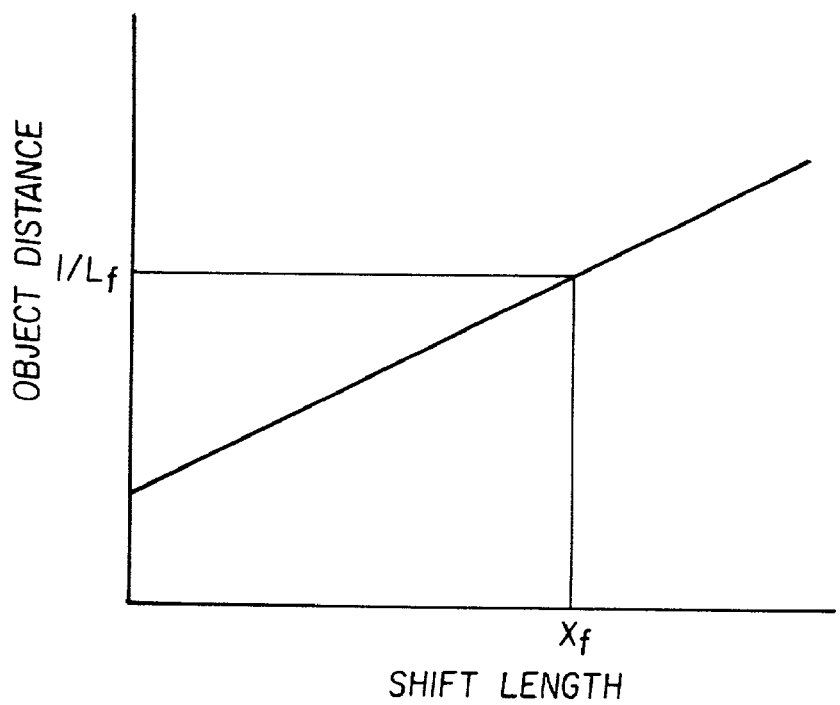
FIG. 5 shows a curve relating the shift length $X_f$ and the inverse of the object distance $1/L_f$ with each other.

The auto-focusing correction (AF correction) operation will now be described. When the zoom lens 2 move via the pressed zoom-up SW or the pressed zoom-down SW, when the temperature of the lens mount 5 changes due to the temperature change of the air or due to the internal heat generation, when the image pickup lens is changed or when the release switch is pressed, the change 32 of the lens focusing curve C1, that is a conversion reference, is caused as shown in FIG. 3(a). As a result, the lens-focusing curve C2 is a correct one now. When the change is caused, it is necessary to correct the lens-focusing curve C1. When it is necessary to correct the lens-focusing curve C1, the focusing lens position $A_f$ of an arbitrary object is detected by the AF operation using the TTL focus detecting means. At the same time, the object distance of the arbitrary object is measured using the open-control range finding means, and the inverse of the object distance, that is $1/L_f$, is calculated using the foregoing relational expression (1) and the shift length $X_f$. The shift length $X_f$ and the inverse of the object distance $1/L_f$ are related with each other as described in FIG. 5.

Figure 3B:
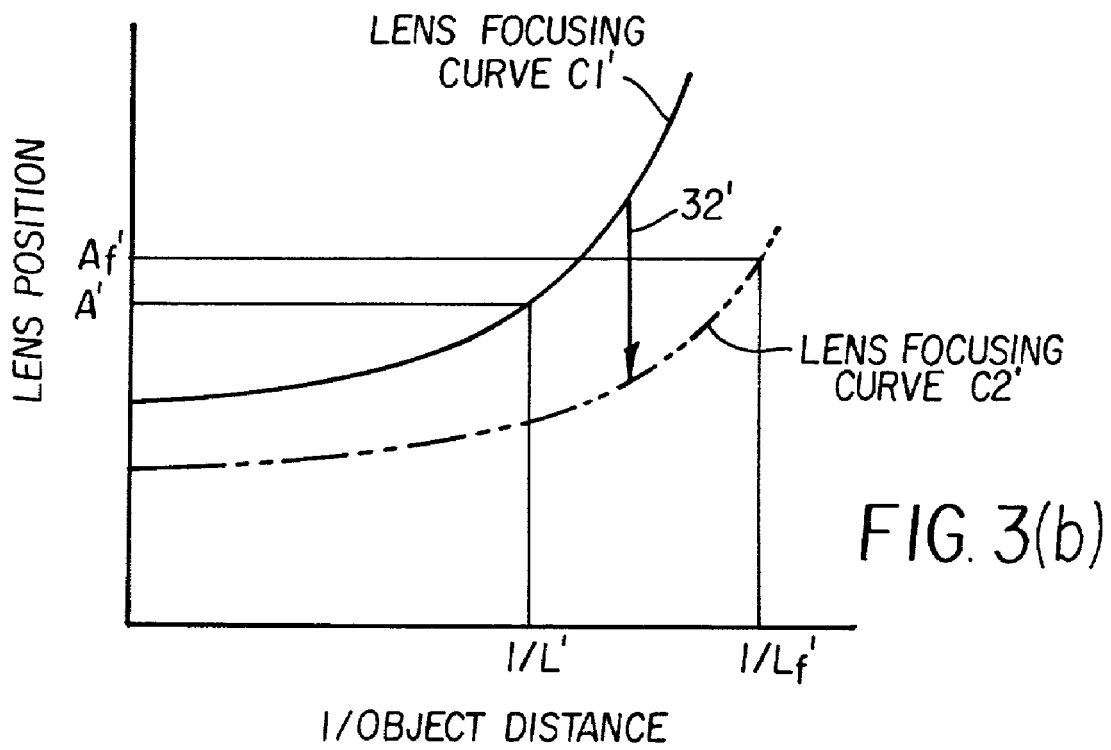

By feeding back the result of the above described calibration to the lens focusing curve C1 in FIG. 3(a), a corrected lens focusing curve C2 is obtained. In detail, the correction is made such that the corrected lens focusing curve C2 passes the point $(1/L_f, A_f)$. Although the AF correction may be conducted more accurately by using the results of the measurements on the objects at the respective distances, it takes a time to complete the alternative AF correction. When the accuracy of the correction is important, the alternative AF correction is preferable. When a vari-focal lens is used, not only the lens position for the object at the infinity-point but also the lens focusing curve change as shown in FIG. 3(b). In this case, the AF correction is conducted by storing the coordinate data for many of the variable lens focusing curves in any of the EEPROM and the internal memory in the CPU 16 in advance and by selecting a lens focusing curve, that passes the calculated point $(1/L_f, A_f)$ or the vicinity of the calculated point $(1/L_f, A_f)$. The AF correction operations are conducted as described above.

The operation of the TG (timing signal generator) 17 will now be described. The TG 17 outputs a predetermined timing signal to the CPU 16, the image pickup circuit 7 and the CCD driver 18. The CPU 16 conducts various operations synchronizing with the timing signal. The image pickup circuit 7 conducts various image processing operations including color signal separation synchronizing with the timing signal. The CCD driver 18 drives the CCD 6 synchronizing with the timing signal. Thus, image data is obtained by synchronizing the CPU 16, the image pickup circuit 7 and the CCD driver 18.

The storing and reproducing operation will now be described. As soon as the operator, who has selected an object, presses the first release SW of the electrical image pickup apparatus 1, the electrical image pickup apparatus 1 starts the AE operation and the AF operation. The aperture 4 is open during the waiting period and during the AE operation conducted in response to the first release signal. Then, the image pickup operation is conducted in response to the second release signal. During the image pickup operation, the aperture 4 adjusts the exposure light amount. When the image pickup operation is conducted, the image data stored in the memory 9 at the time of command signal generation is outputted also to the compression/expansion circuit 12. The compressor circuit of the compression/expansion circuit 12 compresses the outputted image data. Then, the compressed image data is converted to have an appropriate form suitable for storing, and the compressed and converted image data is stored in the storage memory 13. Thus, the storing operation is completed.

As soon as the operator presses the not shown reproducing SW of the SW's 25 for generating the command signal for conducting the reproducing operation, the reproducing operation starts. First, the compressed image data stored in the storage memory 13 is outputted to the compression/expansion circuit 12. The compressed image data is decoded and expanded in the expander circuit of the compression/expansion circuit 12. The decoded and expanded image data is outputted to the memory 9 and stored therein. The decoded and expanded image data is outputted also to the D/A converter 10. The D/A converter 10 converts the image data to an analog image signal suitable for displaying. The analog image signal is outputted to the LCD 11 and displayed thereon.

Figure 6:
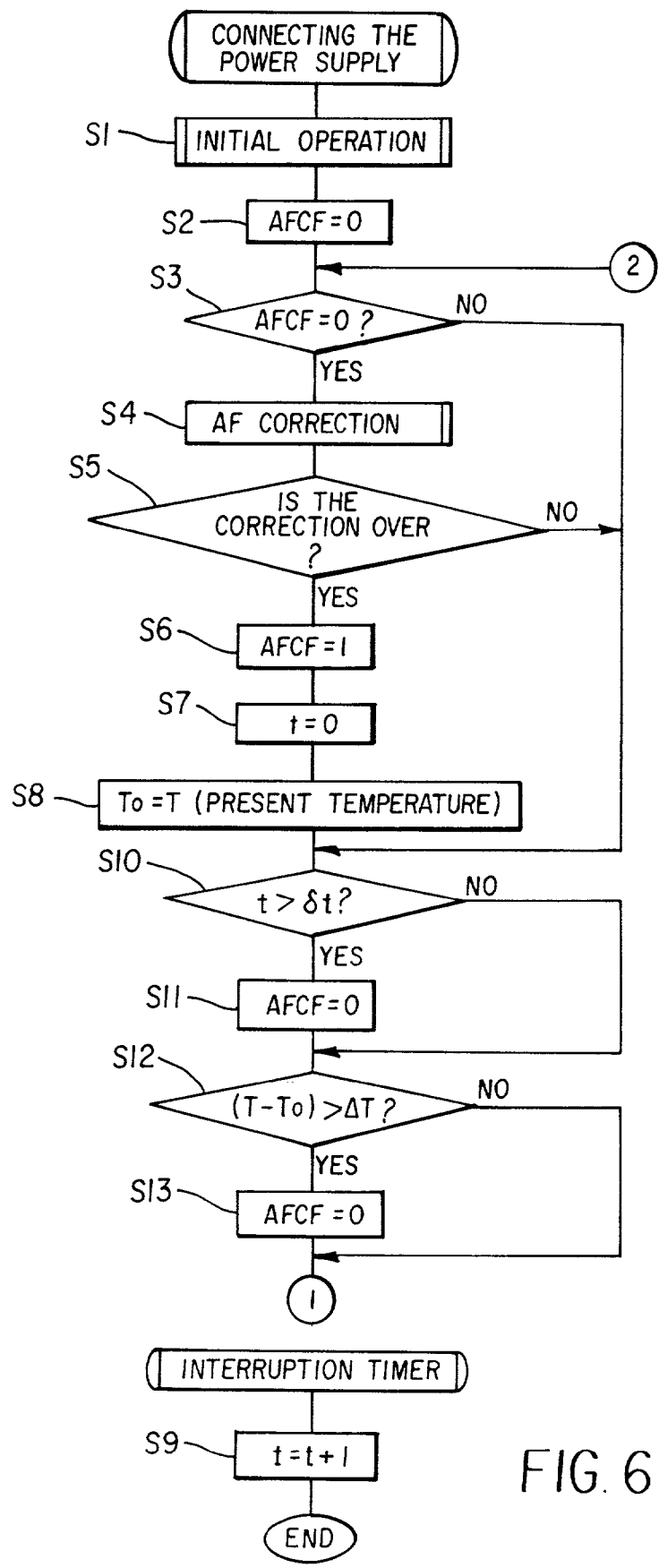
FIG. 6 is a flowchart describing a part of the image pickup operation conducted by the electronic image pickup apparatus according to the invention.
Figure 7:
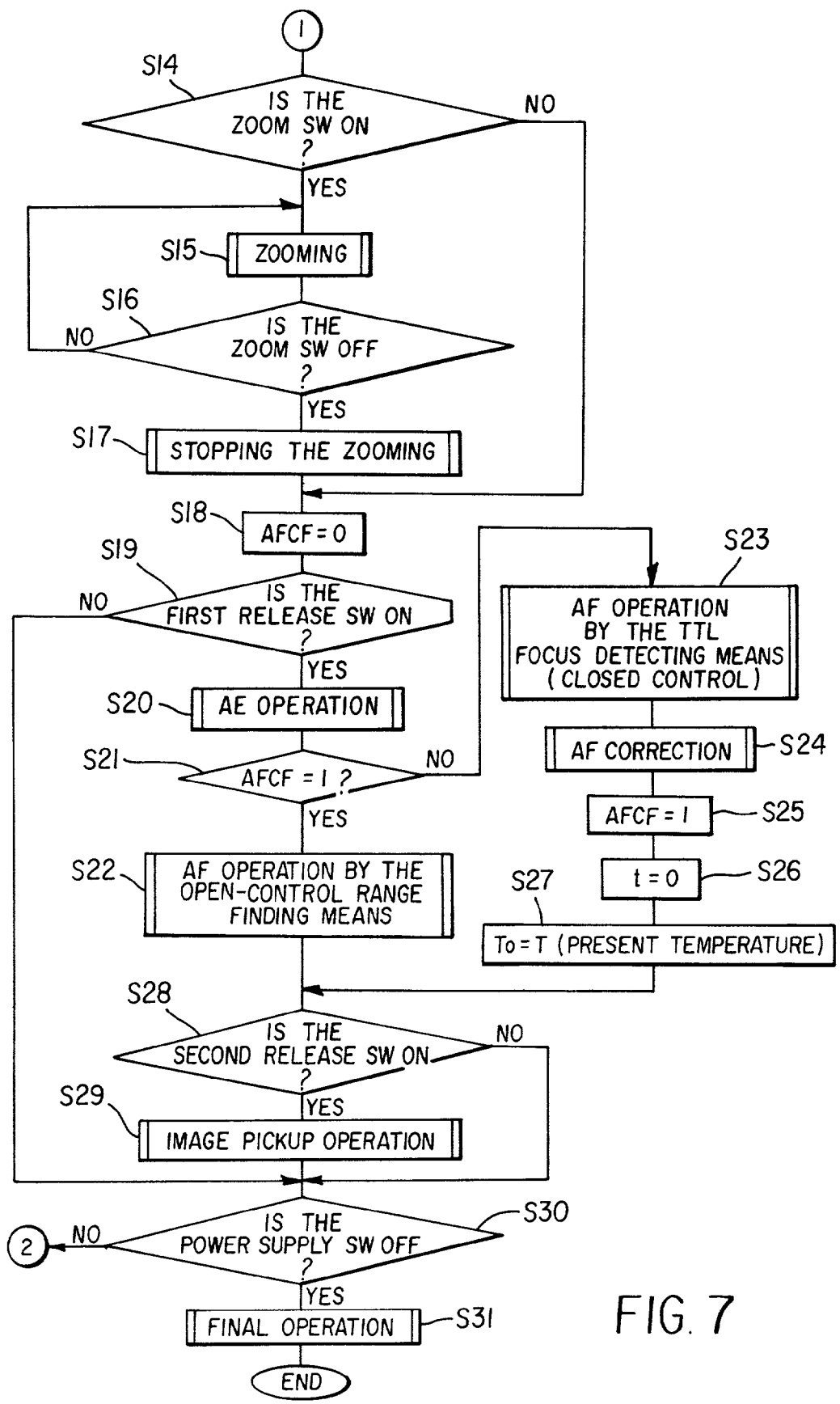
FIG. 7 is a flowchart describing another part of the image pickup operation conducted by the electronic image pickup apparatus according to the invention.

The operations of the constituent components in the auto-focusing device conducted when the electronic image pickup apparatus 1 is used to pick up the object image and the signal flows therein will now be described. FIGS. 6 and 7 show flow charts describing the image pickup process conducted by the electronic image pickup apparatus 1. As soon as the main power supply switch of the SW's 25 is switched on, the CPU 16 starts the image pickup process. As soon as the power supply switch is switched on, the CPU 16 conducts initial operation in the step S1. The initial operation includes checking the capacity of the storage memory 13, checking the voltage of the battery 27 and pulling out the lens mount 5. In the second step S2, the CPU 16 clears (put to zero) the flag AFCF (hereinafter referred to as the "AFCF"), indicating whether the AF correction has been done or not. The AFCF is 0 if the AF correction (hereinafter referred simply as the "correction" sometimes) has not been done yet, and 1 if the correction has been done already.

In the step S3, the CPU 16 checks whether the AFCF is 0 or not. If the correction not has been done yet (AFCF=0), the process will proceed to the step S4. If the correction has been done already (AFCF=1), the process will jump to the top of the step S4. In the step S4, the CPU 16 conducts the foregoing correction. The correction in the step S4 is not always conducted after the operator has been prepared to pick up the object image. Since the image pickup conditions are not good when the operator is not prepared to pick up the object image, the correction is not satisfactory in some cases. Therefore, the CPU 16 checks, in the step S5, whether the correction has been finished or not. If the correction has been finished already, the AFCF is switched to 1. If the correction has not been finished yet, the process jumps to the top of the step S10. Then, the CPU 16 shifts to checking whether the correction should be conducted again or not (whether the re-correction should be conducted or not). The check items include the conditions for the re-correction including the time condition and the temperature condition.

After the step S6 is over, the count "t" of the timer for the timer count operation conducted simultaneously is cleared such that t=0 in the step S7. The not shown temperature measuring means measures the temperature T of the lens mount 5 and rewrites the present temperature $T_O$ of the lens mount 5 stored in the not shown temperature storage means to the measured temperature T in the step S8. Then, the CPU 16 checks the time condition for conducting re-correction. In the interruption process, t is a periodical interruption timer for periodically conducting correction. The periodical interruption timer t is counted up when the timer counting operation is conducted on the periodical interruption timer in the step S9. When it is found that the timer count value exceeds the allowable period $\delta_t$ in the step S10, the AFCF is cleared in the step S11 considering that the correction has not been done yet. The AF correction is conducted again after returning to the top of the step S4. Then, the temperature condition for conducting re-correction is checked.

In the step S12, the CPU 16 checks whether the difference between the present temperature T and the last temperature $T_O$ of the lens mount 5 exceeds the allowable temperature change $\Delta T$. When it is found in the step S12 that the temperature difference exceeds the allowable temperature change $\Delta T$, the AFCF is cleared in the step S13 considering that the correction has not been done yet. The AF correction is conducted again after returning to the top of the step S4.

Thus, the AF correction is conducted considering the time condition and the temperature condition.

Referring now to FIG. 7, the zoom-up SW or the zoom-down SW (hereinafter referred to collectively as the "zoom SW") is monitored to find, in the step S14, whether the zoom SW is ON or OFF. The process proceeds to the top of the step S15 when the zoom SW is ON or jumps to the top of the step S18 when the zoom SW is OFF. When the zoom SW is ON, the zooming operation is conducted in the step S15. As described earlier, the zooming operation is an operation that drives the zooming motor 24 via the zooming motor driver 21 to move the zoom lens 2 along the optical axis. The zooming operation continues until the operator stops pressing the zoom SW, i.e. until the OFF of the zoom SW is detected in the step S16. When the operator stops pressing the zoom SW, the zooming operation is stopped and the zoom lens 2 stop moving in the step S17. Then, the AFCF is cleared in the step S18. Later, re-correction is made in the step S4. Then, the image pickup operation is conducted.

In the step S19, the CPU 16 checks whether the first release SW is ON or not. When the first release SW is ON, the AE operation is conducted in the step S20 in advance of obtaining the image signal. In the AE operation, the image pickup optical system adjusts the light amount by closing the aperture 4 from the open state thereof. When the light amount is proper, the object image is focused. Then, the AF operation is conducted. First, the CPU 16 checks the AFCF, since the AF operation is conducted in the different way depending on whether the AFCF is 1 or 0. The CPU 16 checks whether the AFCF is 1 or 0. When the ACFC is 1, i.e. when the correction has been done already, the AF operation is conducted in the step S22 by the open-control range finding means described earlier. The focusing lens 3 is moved fast to the focusing position.

When the AFCF is 0, i.e. when the correction has not been done yet, the AF operation is conducted in the step S22 by the TTL focus detecting means. Then, AF correction is conducted in the step S24 in the same way as in the step 4. Then, the AFCF is set at 1 in the step S25 indicating that the correction has been done already. The count t of the timer is cleared, i.e. set at 0, in the step S26. The stored temperature data $T_O$ of the lens mount 5 is set at the present temperature in the step S27. Now it is possible for the open-control range finding means to conduct a high-speed AF operation. As soon as the ON of the second release switch is detected in the step S28, the image pickup operation is conducted in the step S29 and the image data is stored temporarily in the memory 9. The image data stored temporarily in the memory 9 is output also to the compression/expansion circuit 12. The image data is compressed by the compressor circuit in the compression/expansion circuit 12. The compressed image data is converted to an appropriate form and stored in the storage memory 13.

According to the invention, a continuous image pickup mode of operation is conducted by keeping pressing down the second release SW. Since the AF correction has been done in the step S24, it is possible for the high-speed open-control range finding means to conduct the AF operation during the continuous image pickup mode of operation, that is to measure the distance of the moving object. Then, the power supply SW is monitored. The power supply SW is monitored in the step S30 to find whether the power supply SW is OFF or not. When the power supply SW is OFF, the closing operation is conducted in the step S31. After all the operations have been completed, the power supply from the battery 27 is disconnected. When the power supply SW is not OFF, the process returns to the top of the step S3 and the similar operations are repeated. The CPU 16 controls all the operations described above.

As described above, the auto-focusing device used in the electronic image pickup apparatus according to the invention uses the open-control range finding means mainly in picking up an object image without using the TTL focus detecting means as much as possible. The auto-focusing device according to the invention avoids the shortcomings of the TTL focus detecting means such as slow focus detection, much electric power consumption and large errors caused in detecting the focus of dark objects. The auto-focusing device according to the invention, that conducts corrections, facilitates employing the image pickup lens, mounted on an inexpensive plastic mount, for the usual electronic still camera. The auto-focusing device according to the invention facilitates measuring the distance of a moving object and conducting automatic focusing during continuously picking up an object. The auto-focusing device according to the invention will meet the future demands for high magnification of zooming and high image qualities.

The auto-focusing device and the electronic image pickup apparatus according to the invention facilitate realizing both the high focusing accuracy specific to the TTL focus detecting means and the high-speed focusing specific to the open-control range finding means. The auto-focusing device and the electronic image pickup apparatus according to the invention facilitates using an image pickup lens mounted on an inexpensive plastic mount and a vari-focal lens.

What is claimed is:

1. An automatic focusing device comprising:
   an image pickup lens including a moveable focusing lens, wherein the focusing lens moves to form an image of an object at an image plane;
   an image pickup means, wherein the image pickup means picks up the image of the object at the image plane and outputs an electrical signal corresponding to the image of the object;
   a TTL focus detecting means, wherein the TTL focus detects means detects a focusing state of the image pickup lens based on the electrical signal output from the image pickup means;
   an open-control range finding means, wherein the open-control range finding means measures the distance of the object between the automatic focusing device and the object;
   a focusing lens position detecting means, wherein the focusing lens position detecting means detects at least one of a focusing position and a shift length of the focusing lens;
   a driving and controlling means, wherein the driving and controlling means obtains a focusing position of the focusing lens based on a conversion reference for converting the distance of the object measured by the open-control range finding means to the focusing position of the focusing lens, whereby to move the focusing lens to the focusing position thereof;
   wherein the driving and controlling means moves the focusing lens based on the focusing state of the image pickup lens detected by the TTL focus detecting means when it is necessary to correct the conversion reference;
   wherein the driving and controlling means makes the focusing lens position detecting means detect the focusing position or the shift length of the focusing lens;
   wherein the driving and controlling means makes the open-control range finding means measure the distance of the object; and wherein the driving and controlling means corrects the conversion reference based on at least one of the detected focusing position and the detected shift length of the focusing lens, and the measured distance of the object.

2. The automatic focusing device according to claim 1, wherein the conversion reference is a lens focusing curve relating the inverse of the distance of the object and the position of the focusing lens, and correcting the conversion reference comprises shifting the lens focusing curve such that the lens focusing curve passes the point defined by the inverse of the distance of the object measured by the open-control range finding means and the focusing position of the focusing lens detected by the focusing lens position detecting means or selecting a lens focusing curve that passes the point defined by the inverse of the distance of the object measured by the open-control range finding means and the focusing position of the focusing lens detected by the focusing lens position detecting means, from a plurality of lens focusing curves stored in advance.

3. The automatic focusing device according to claim 1, wherein the conversion reference is a lens focusing curve relating the inverse of the distance of the object and the position of the focusing lens, and correcting the conversion reference comprises calculating a new focusing position of the focusing lens by adding the shift length of the focusing lens detected by the focusing lens position detecting means to the focusing position not corrected yet, whereby to obtain a new lens focusing curve, that passes the point defined by the inverse of the distance of the object measured by the open-control range finding means and the new focusing position of the focusing lens, or selecting a lens focusing curve, that passes the point defined by the inverse of the distance of the object measured by the open-control range finding means and the new focusing position of the focusing lens, from a plurality of lens focusing curves stored in advance.

4. The automatic focusing device according to claim 1, wherein the image pickup lens comprises zoom lens, and the conversion reference is corrected one or more times when the zooming ratio of the image pickup lens exceeds a predetermined range.

5. The automatic focusing device according to claim 1, wherein the automatic focusing device further comprises a temperature measuring means that measures the temperature of the automatic focusing device, and a temperature storage means that stores the measured temperature, and the conversion reference is corrected one or more times when the difference between the present temperature measured by the temperature measuring means and the last temperature measured during the last correction and stored in the temperature storage means exceeds a predetermined range.

6. An electronic image pickup apparatus comprising:
an image pickup lens including a moveable focusing lens, wherein the focusing lens moves to form an image of an object at an image plane;
an image pickup means, wherein the image pickup means picks up the image of the object at the image plane and outputs an image signal;
a TTL focus detecting means, wherein the TTL focus detecting means detects a focusing state of the image pickup lens based on the image signal output from the image pickup means;
a storing and reproducing means, the storing and reproducing means storing the image of the object based on the image signal outputted from the image pickup means, the storing and reproducing means reproducing the stored image of the object;
an open-control range finding means, wherein the open-control range finding means measures the distance of the object between the electronic image pickup apparatus and the object;
a focusing lens position detecting means, wherein the focusing lens position detecting means detects at least one of a focusing position and a shift length of the focusing lens;
a driving and controlling means, wherein the driving and controlling means obtains a focusing position of the focusing lens based on a conversion reference for converting the distance of the object measured by the open-control range finding means to the focusing position of the focusing lens, whereby to move the focusing lens to the focusing position thereof;
wherein the driving and controlling means moves the focusing lens based on the focusing state of the image pickup lens detected by the TTL focus detecting means when it is necessary to correct the conversion reference;
wherein the driving and controlling means makes the focusing lens position detecting means detect at least one of the focusing position and the shift length of the focusing lens;
wherein the driving and controlling means makes the open-control range finding means measure the distance of the object; and
wherein the driving and controlling means corrects the conversion reference based on the detected focusing position, thereat the image of the object is focused, or the detected shift length of the focusing lens, thereat the image of the object is focused, and the measured distance of the object.

7. The electronic image pickup apparatus according to claim 6, wherein the conversion reference is a lens focusing curve relating the inverse of the distance of the object and the position of the focusing lens, and correcting the conversion reference comprises shifting the lens focusing curve such that the lens focusing curve passes the point defined by the inverse of the distance of the object measured by the open-control range finding means and the focusing position of the focusing lens detected by the focusing lens position detecting means or selecting a lens focusing curve, that passes the point defined by the inverse of the distance of the object measured by the open-control range finding means and the focusing position of the focusing lens detected by the focusing lens position detecting means, from a plurality of lens focusing curves stored in advance.

8. The electronic image pickup apparatus according to claim 6, wherein the conversion reference is a lens focusing curve relating the inverse of the distance of the object and the position of the focusing lens, and correcting the conversion reference comprises calculating a new focusing position of the focusing lens by adding the shift length of the focusing lens detected by the focusing lens position detecting means to the focusing position not corrected yet, whereby to obtain a new lens focusing curve, that passes the point defined by the inverse of the distance of the object measured by the open-control range finding means and the new focusing position of the focusing lens, or selecting a lens focusing curve, that passes the point defined by the inverse of the distance of the object measured by the open-control range finding means and the new focusing position of the focusing lens, from a plurality of lens focusing curves stored in advance.

9. The electronic image pickup apparatus according to claim 6, wherein the image pickup lens comprises zoom lens, and the conversion reference is corrected one or more times when the zooming ratio of the image pickup lens exceeds a predetermined range.

10. The electronic image pickup apparatus according to claim 6, wherein the electronic image pickup apparatus further comprises a temperature measuring means that measures the temperature of the electronic image pickup apparatus, and a temperature storage means that stores the measured temperature, and the conversion reference is corrected one or more times when the difference between the present temperature measured by the temperature measuring means and the last temperature measured during the last correction and stored in the temperature storage means exceeds a predetermined range.

11. The electronic image pickup apparatus according to claim 6, wherein the image pickup lens is exchangeable, and the conversion reference is corrected one or more times when image pickup lens is changed to another one.

12. The electronic image pickup apparatus according to claim 6, wherein the electronic image pickup apparatus further comprises a release switch capable of conducting a first stage of switching when the release switch is pressed halfway, and a second stage of switching when the release switch is fully pressed, the conversion reference is corrected one or more times when the first stage of switching is conducted, and the focusing lens is moved to the focusing position thereof calculated from the distance of the object measured by the open-control range finding means when the second stage of switching is conducted.

* * * * *